(12) United States Patent
Huntley et al.

(10) Patent No.: US 8,690,167 B1
(45) Date of Patent: Apr. 8, 2014

(54) WHEELED TRANSPORT SYSTEM

(75) Inventors: Alan Edward Huntley, Gulf Breeze, FL (US); Craig Maurice Harrison, Gulf Breeze, FL (US)

(73) Assignee: Alan Edward Huntley, Gulf Breeze, FL (US)

( * ) Notice: Subject to any disclaimer, the term of this patent is extended or adjusted under 35 U.S.C. 154(b) by 0 days.

(21) Appl. No.: 13/592,936

(22) Filed: Aug. 23, 2012

Related U.S. Application Data

(60) Provisional application No. 61/527,208, filed on Aug. 25, 2011.

(51) Int. Cl.
  *B62B 1/12* (2006.01)

(52) U.S. Cl.
  USPC .................... 280/47.331; 280/414.2; 280/63

(58) Field of Classification Search
  USPC ............. 280/47.17, 47.19, 47.24, 47.331, 63, 280/64, 79.11, 79.7, 30, 40, 35, 651, 652, 280/414.1, 414.2, 414.3
  See application file for complete search history.

(56) References Cited

U.S. PATENT DOCUMENTS

| | | | |
|---|---|---|---|
| 2,540,279 A | 2/1951 | Mosier | |
| 2,966,368 A | 12/1960 | Engnell | |
| 4,712,803 A | 12/1987 | Garcia | |
| 5,072,959 A | 12/1991 | Marullo | |
| 5,203,580 A | 4/1993 | Cunningham | |
| 5,348,327 A * | 9/1994 | Gieske | 280/47.331 |
| 5,791,279 A | 8/1998 | Hart | |
| 5,823,551 A * | 10/1998 | Conroy | 280/47.131 |
| D427,407 S | 6/2000 | Witt | |
| 6,070,906 A * | 6/2000 | Allen | 280/814 |
| 6,189,900 B1 | 2/2001 | MacDonald | |
| 6,364,336 B1 | 4/2002 | Jenkins | |
| 6,926,292 B1 | 8/2005 | Weeks | |
| 7,243,928 B2 | 7/2007 | Singer | |
| 7,296,816 B2 * | 11/2007 | Wilnau | 280/414.2 |
| 7,775,530 B2 | 8/2010 | Darling, III | |
| D624,725 S | 9/2010 | Turnell | |
| 2001/0052686 A1 * | 12/2001 | Galik | 280/292 |
| 2006/0186635 A1 | 8/2006 | Stewart | |

FOREIGN PATENT DOCUMENTS

DE  19538080  4/1997

* cited by examiner

*Primary Examiner* — John Walters
(74) *Attorney, Agent, or Firm* — Mind Law Firm, P.C.; Justin G. Sanders; Jeromye V. Sartain

(57) ABSTRACT

A wheeled transport system for towing an at least one object comprises, in at least one embodiment, a wheel assembly. The wheel assembly comprises an axle, sized and configured for supporting a rear end of the object, and a pair of wheels rotatably engagable with opposing ends of the axle. A frame is integral with the axle and is sized and configured for slidably receiving therethrough the rear end of the object. An at least one retaining strap is configured for selectively engaging and maintaining the rear end of the object in position between the axle and the frame. A pair of storage axles is integral with the axle, with each being configured for selectively receiving one of the wheels in rotatable engagement therewith. Thus, in at least one embodiment, the wheel assembly is capable of being selectively arranged into one of a deployed state and a stored state.

20 Claims, 5 Drawing Sheets

WHEELED TRANSPORT SYSTEM

RELATED APPLICATIONS

This application claims priority and is entitled to the filing date of U.S. Provisional application Ser. No. 61/527,208, filed on Aug. 25, 2011 and entitled "Attached wheels to a surfboard so it can be pulled or pushed." The contents of the aforementioned application are incorporated by reference herein.

INCORPORATION BY REFERENCE

Applicant(s) hereby incorporate herein by reference any and all U.S. patents and U.S. patent applications cited or referred to in this application.

BACKGROUND OF THE INVENTION

1. Field of the Invention

Aspects of this invention relate generally to transport systems, and more particularly to a wheeled transport system configured for allowing one or more long, cumbersome objects to be towed and transported with relative ease.

2. Description of Related Art

Transporting surfboards, paddleboards, kayaks and other small, yet heavy and cumbersome, watercraft to and from the beach or other bodies of water is oftentimes accomplished using motor vehicles. However, getting the watercraft from the vehicle to the water's edge can prove difficult. Traditionally, the only option has been to carry the objects by hand. However, in response to this problem, wheeled devices, such as dollies, carts and the like, have been implemented to assist in selectively towing such objects. Similar wheeled devices have been created to assist in moving other types of long, cumbersome objects, such as construction materials and trees.

The following art defines the present state of this field:

U.S. Pat. No. 2,540,279 to Mosier is generally directed to a wheeled support means for supporting a small boat so that the boat may be towed over the road behind an automobile or may be moved about on the ground.

U.S. Pat. No. 2,966,368 to Engnell is generally directed to a supporting device for boats comprising an elongated bracket, a shaft extending longitudinally of said bracket and having wheels mounted thereon outwardly of each end of said bracket, an auxiliary support bar positioned at each end of said bracket inwardly of said wheels, two pairs of oppositely-disposed arms pivotally connected to said bracket inwardly of said auxiliary support bars, each pair of arms extending inwardly, a transverse boat keel clamping bar mounted on the inner ends of each pair of arms, a pair of springs connected to said bracket, each spring underlying a respective clamping bar and urging said clamping bar away from said bracket and from each other, and pivot means for said arms extending through said bracket and said pairs of arms, said arms having a plurality of spaced apart pivot means receiving apertures therethrough for longitudinally adjusting said arms on said pivot means.

U.S. Pat. No. 4,712,803 to Garcia is generally directed to a dolly for carrying sailboards having a frame made of lightweight tubing and two pneumatic tired wheels mounted independently on opposite sides of the frame. The frame utilizes a telescoping tube arrangement to enable it to provide rigid support for the sailboard, and to allow it to be collapsed into a small, relatively flat package for storage. The dolly is designed particularly, so as to be able to easily transport sailboards across soft sandy beaches, without sinking in the sand, as well as on hard paved surfaces.

U.S. Pat. No. 5,072,959 to Marullo is generally directed to a boat carrier for manually transporting a canoe in the field. The device allows a user to pull the canoe and any fishing gear to any distance in one easy trip. The boat carrier includes a quick disassemble frame for receiving the canoe near the midsection, a pair of transversely spaced-apart heavy terrain wheels attached to the frame, and a pair of hold down brackets for resiliently securing the canoe to the frame assembly.

U.S. Pat. No. 5,203,580 to Cunningham is generally directed to a canoe toting apparatus which enables an individual to manually mount and transport a canoe or similar marine craft over reasonable distances. The apparatus includes a pair of large diameter wheels rotatably mounted on opposite ends of an adjustable length axle. Wheel stabilisers, coupled to the axle, may be pivoted into interfering engagement with the wheels to prevent the wheels from rotating while the marine craft is positioned on the toting apparatus. A pair of resilient guide members are slidably mounted over the axle and adapted to receive the underside of the marine craft. An adjustable length strap, coupled to the axle, is securable about the gunwales of the craft to secure the craft against the toting apparatus.

U.S. Pat. No. 5,348,327 to Gieske is generally directed to a collapsible surf or sailboard dolly having the option to be manually towed behind one walking or be trailered behind a bicycle using a new and improved universal hitch attached to a bicycle. The bicycle hitch mounts generally horizontally to the bicycle's accessory holes and clamped around frame's chainstay holes. The dolly has a rear main wheeled support assembly strapped to a board. The main support assembly has wheels which are removable (in seconds) without the use of any tools. The wheels are held to the assembly with a Velcro and strap wrapping arrangement which positively hold the wheels to the main support tube. The dolly has a separate arm structure which straps to the nose of the board and is held onto the board by the wedging effect of the strapping arrangement. The rear support assembly is held to the board with the same wedging effect. A tightened center coupling strap causes the front arm structure and rear main support strapping to wedge over the board. The dolly can be quickly attached to the bicycle hitch using a hitch pin inserted through a hole provided in the arm structure and a hitch eye bolt without any disassembly of the dollies manually towed structure. Therefore, the user can manually tow their board and associated gear easily to the water's edge or trailer it behind ones bicycle.

German Patent No. 19538080 to Jaksch is generally directed to a transporting device having two wheels on a common axle and beams folding on two latch joints and connected by transporting tie-rods. The wheel and latch joint axles are aligned with each other. The latch joints are unlocked in the folded position. The beams can be turned in a single hand movement about an opening angle to engage the latch joints in the position for use. General-purpose locking joints can be used for the latch joints.

U.S. Pat. No. 5,791,279 to Hart is generally directed to a self-stowing canoe transporting apparatus which enables manual transport of a canoe over rough terrain in an upright position. The transporting apparatus includes a dual-wheeled dolly with a cradle having contoured constrained abutment portions which support the aft bottom or keel of a canoe. The transporting apparatus is attachable to the canoe without drilling, welding, use of adhesives, or any form of modification of the canoe. The dolly is pivotally attached at the stern of the canoe enabling rotational motion of the dolly to an aft deck stowage position during use of the canoe on the water. In portaging, the cradle rotates under the canoe, and secure engagement of the cradle with the canoe aft bottom or keel is accomplished with tensioning straps.

U.S. Design Pat. No. D427,407 to Witt is generally directed to an ornamental design for a boat carrier.

U.S. Pat. No. 6,189,900 to MacDonald is generally directed to a cart for moving small watercraft, such as canoes or kayaks. The cart supports one or two watercraft in a stacked configuration. The cart is constructed to be strong and durable, and provide an easy and simple way to load and move small watercraft. The cart is constructed from an arcuate metal tube having a pair of arms, one each extending from one end of the arcuate metal tube. The arms each support a wheel. The watercraft fits through the arcuate tube, and the bottom on the watercraft rests on the ends of the arcuate tube. The arcuate tube lies at an angle relative to the longitudinal axis of the watercraft with the middle of the arcuate tube resting on the top of the watercraft, forward of the part of the watercraft where the bottom of the watercraft rests on the ends of the arcuate tube. A second arcuate metal tube may be pivotally attached to the first arcuate tube. The two tubes are connected at their middle. When the tubes are coincident, one watercraft may be supported. When the second tube is pivoted 180.degree. relative to the first tube, two watercraft can be carried simultaneously.

U.S. Pat. No. 6,364,336 to Jenkins is generally directed to a transport device for one end of a flat bottomed rowboat or a canoe with a keel. The device includes a generally flat rectangular support member having a generally flat top surface provided with a central flat bottomed recess dimensioned to receive the keel of a canoe. The top surface of the support member is provided with a resilient high friction coating that will resist the lateral displacement of a canoe or rowboat on the support member. The device further includes a wheel and axle assembly and a quick release securing unit. The support member is cantilevered relative to the wheel and axle assembly and the wheels are positioned beneath the opposed sides of the support member.

U.S. Pat. No. 6,926,292 to Weeks is generally directed to a cart for transporting a load. The cart has a frame having an upper end and a lower end, at least two laterally spaced apart support surfaces secured adjacent the upper end of the frame, and a pair of transversely opposed wheels adjacent the lower end of the frame to rollably support the frame above a surface. Each wheel is positionable in either one of two laterally offset positions relative to the support surface. In the first offset position, each wheel is positioned laterally inboard of the support surface, and in the second offset position, the wheel is positioned laterally outboard of the support surface.

U.S. Patent Application Publication No. 2006/0186635 to Stewart is generally directed to a U.S. Pat. No. 7,243,928 to Singer is generally directed to a lightweight foldable cart for transporting on wheels one end of a small boat. The cart includes a pair of identical frame or strut members, each being U-shaped with spaced arms extending parallel to each other from ends of a rear plate. Distal ends of the arms each include an opening for a shaft so that when the shaft extends through the openings joining the distal ends of the arms the frame members can be rotated about the shaft from an extended, deployed position to a folded position for storage. Each rear plate has an opening for an axle, which extends through the openings in the rear plate for supporting rotatable wheels at each end of the axle. A boat supporting bumper is mounted on the distal ends of the arms when the strut members are extended into the deployed position. The bumper is shaped to accommodate a bottom of the end of the boat to be supported and transported.

U.S. Pat. No. 7,296,816 to Wilnau is generally directed to a lightweight equipment transport kit and system for transporting rigid items having a wheel assembly; a head piece defining an enclosure for insertion of the front end of the equipment; a tail piece defining an enclosure for insertion and support of the rear end of the equipment, and further having a mount or axle sleeve for bearing the wheel assembly in a substantially transverse orientation to a direction of transportation, and wherein the wheel assembly supports the tail piece; and a tensioner capable of fastening to the head piece, fastening to the tail piece or the wheel assembly mounted on the tail piece, and creating a tension between so as to seat the front end of the equipment within head piece and the rear end of the equipment within the tail piece. The equipment transport system is adaptable for manual towing, vehicular towing, and mounting onto an automobile roof rack.

U.S. Pat. No. 7,775,530 to Darling, III is generally directed to an integrated multi-purpose deployment field system which enables a user to build a plurality of field pieces of equipment for field use in recreation, rescue, medicine, military operations, disaster relief and non-motorized cargo hauling. The system includes assembling the field equipment from a plurality of interchangeable T-shaped load support components. Each load support component has a generally horizontal load support member which is configured to support a particular type of load in the field, and a generally vertically extending support strut which extends from a midsection of the horizontal load support member. A load support attachment, such as a wheel axle or a cross brace, engages with each horizontal load support member, and joins the horizontal support members so that the T-shaped load support components, vertical struts, and load support attachments form a load bearing structure when assembled.

U.S. Design Pat. No. D624,725 to Turnell is generally directed to an ornamental design for a cart.

The prior art described above teaches various types of wheeled transport devices for towing boards and other small watercraft, but does not teach such a wheeled transport system that is modular in construction and capable of being selectively arranged into one of a deployed state and a stored state. Additionally, the prior art fails to teach such a wheeled transport system that is capable of selectively supporting a plurality of long, cumbersome objects in either a vertically stacked fashion or a laterally stacked fashion. Aspects of the present invention fulfill these needs and provide further related advantages as described in the following summary.

SUMMARY OF THE INVENTION

Aspects of the present invention teach certain benefits in construction and use which give rise to the exemplary advantages described below.

The present invention solves the problems described above by providing a wheeled transport system for allowing one or more long, cumbersome objects to be towed and transported with relative ease. The system provides, in the exemplary embodiment, a wheel assembly. The wheel assembly comprises an axle, sized and configured for supporting a rear end of the at least one object thereon, and a pair of wheels rotatably engagable with opposing ends of the axle. A frame is integral with the axle, in a position between the wheels, and is sized and configured for slidably receiving therethrough the rear end of the at least one object. An at least one retaining strap is configured for selectively engaging and maintaining the rear end of the at least one object in position between the axle and the frame. A pair of storage axles is integral with the axle and extend therefrom in a plane substantially perpendicular to the frame, each of the storage axles being configured for selectively receiving one of the wheels in rotatable engagement therewith. Thus, in at least one embodiment, the wheel assembly is capable of being selectively arranged into one of a deployed state, wherein the wheels are engaged with the axle ends for selectively receiving and towing the at least one object during use, and a stored state, wherein the wheels are engaged with the storage axles for storing or transporting the wheel assembly during non-use.

In further embodiments, a support post is integral with the axle and extends substantially perpendicularly therefrom; the support post being configured for providing the option of towing one or more objects in a laterally stacked fashion, with a substantially downwardly-oriented lateral edge of each object in contact with the axle. Thus, in such embodiments, the system is capable of selectively supporting the at least one object in either a vertically stacked fashion or a laterally stacked fashion, depending on the dimensions of the at least one object, thereby enabling the system to support and tow a wide range of objects with relative ease.

In still further embodiments, the system comprises a tow strap assembly configured for allowing the at least one object, while secured to the wheel assembly, to be selectively grasped by hand or engaged with a bicycle seat (or similarly dimensioned seat of a different type of vehicle). A longitudinally-oriented main strap is sized and configured for extending at least the entire length of the at least one object and positionable substantially underneath a longitudinal centerline of the object for supporting the portion of the object that is not supported by the axle. A proximal end of the main strap provides a means for removable engagement with the axle. A distal end of the main strap provides a handle portion, the handle portion defining a handle aperture therewithin configured for selectively being grasped by hand or engaged with a bicycle seat or the like. A seat engagement piece spans at least a portion of the handle aperture and is configured for selectively contacting a top surface of the bicycle seat while a front end of the seat extends though an unobstructed portion of the handle aperture, thereby securely positioning a leading end of the handle portion underneath the seat. Additionally, an at least one laterally-oriented stabilizer strap is engaged with the main strap proximal the distal end thereof and configured for selectively securing the at least one object to the main strap.

In still further embodiments, the system comprises a tow fork configured for allowing the at least one object, while secured to the wheel assembly, to be selectively grasped by hand or engaged with a bicycle (or other type of vehicle). The tow fork provides, in at least one embodiment, a pair of laterally opposed arms sufficiently spaced apart from one another for receiving the front end of the at least one object therebetween. Each of the arms provides a support portion positioned and configured for selectively contacting and supporting a relatively downwardly oriented surface of the object. Each of the arms further provides a hook portion integral with the support portion and configured for extending up and around an adjacent one of the lateral edges of the object and selectively contacting a relatively upwardly oriented surface of the object. Additionally, a lifting portion is integral with the arms and configured for assisting in selectively pivoting and bringing the arms into frictional contact with the each of the upwardly and downwardly oriented surfaces of the at least one object. As such, with the rear end of the at least one object secured to the wheel assembly and the tow fork positioned on the front end of the at least one object, the lifting portion is capable of being selectively elevated, causing the support portion of each arm to move into frictional contact with the downwardly oriented surface of the object and the hook portion of each arm to move into frictional contact with the upwardly oriented surface of the object, thereby frictionally sandwiching the at least one object therebetween and allowing it to be pushed or pulled on the wheel assembly via the tow fork.

A primary objective inherent in the above described system and method of use is to provide advantages not taught by the prior art.

Another objective is to provide such a system that is modular in construction and capable of being selectively arranged into one of a deployed state and a stored state, in at least one embodiment.

A further objective is to provide such a system that is capable of selectively supporting a plurality of long, cumbersome objects in either a vertically stacked fashion or a laterally stacked fashion, in at least one embodiment.

A still further objective is to provide such a system configured for allowing the at least one object to be selectively towed manually or by a vehicle, such as a bicycle, in at least one embodiment.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Features, elements, and aspects of the invention that are referenced by the same numerals in different figures represent the same, equivalent, or similar features, elements, or aspects, in accordance with one or more embodiments.

DETAILED DESCRIPTION OF THE INVENTION

The above described drawing figures illustrate aspects of the invention in at least one of its exemplary embodiments, which are further defined in detail in the following description.

Figure 1:
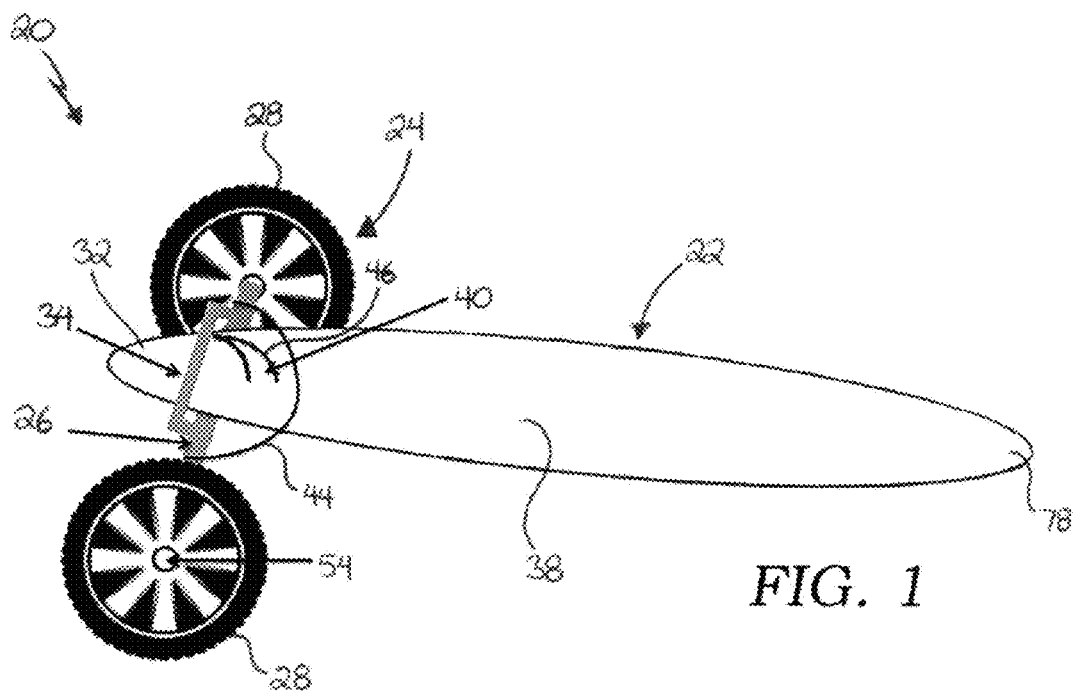
FIG. 1 is a perspective view of an exemplary wheeled transport system, in accordance with at least one embodiment.

Turning now to FIG. 1, there is shown a perspective view of an exemplary wheeled transport system 20, in accordance with at least one embodiment, configured for allowing one or more long, cumbersome objects, such as boards, kayaks or other small watercraft—hereinafter referred to generally as objects—to be towed and transported with relative ease. At the outset, it should be noted that, for illustrative and clarity purposes, the present invention is herein shown and described in the context of towing boards 22, such as surfboards and stand up paddle ("SUP") boards. However, the scope and applicability of the present invention should not be read as being so limited. In fact, the present invention may be sized and configured, in further embodiments, to be used in any other context where assistance in moving one or more long, cumbersome objects—aquatic or otherwise—is needed.

Figure 2:
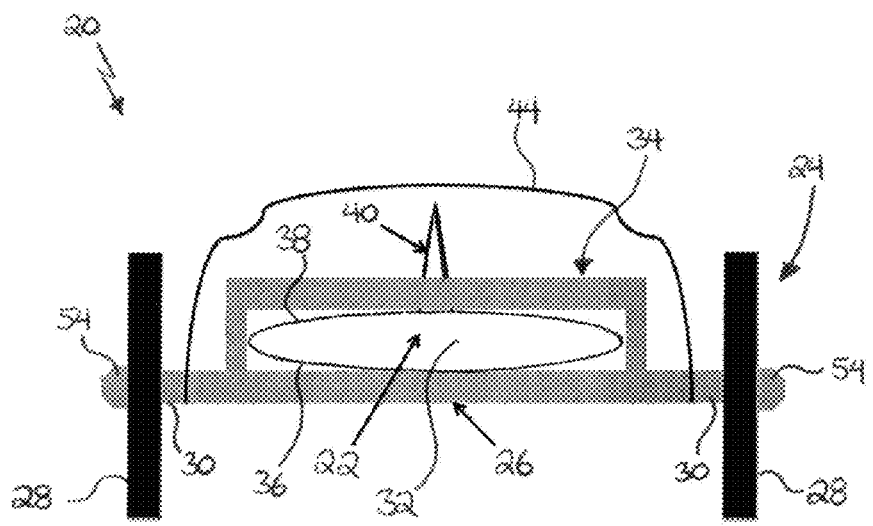
FIG. 2 is a rear elevational view thereof.
Figure 7:
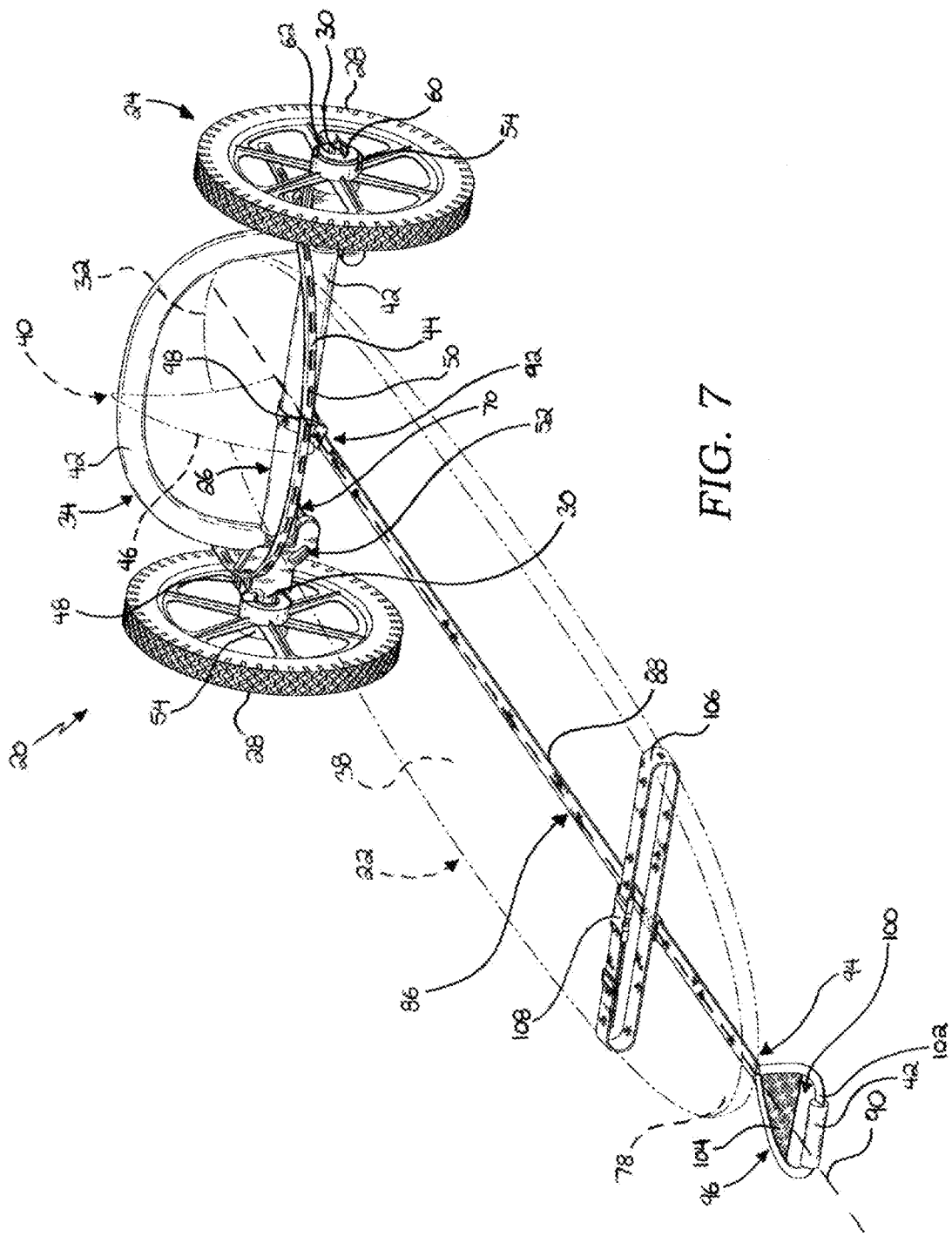
FIG. 7 is a perspective view of a further exemplary wheeled transport system, in accordance with at least one embodiment.

With continued reference to FIG. 1, the system 20 provides, in at least one embodiment, a wheel assembly 24 comprising an axle 26 and a pair of wheels 28 rotatably engagable with opposing ends 30 of the axle 26. The axle 26 is sized and configured, in the exemplary embodiment, for supporting a rear end 32 of the at least one board 22 thereon. A frame 34 is integral with the axle 26 in a position between the wheels 28, and is sized and configured for slidably receiving therethrough the rear end 32 of the at least one board 22 to be towed, with the board 22 in a horizontally flat orientation— i.e., with either a top surface 36 or bottom surface 38 of the board 22 in contact with the axle 26. It should be noted that, where a board 22—or other object having an at least one fin 40 or other relatively perpendicular protrusion integral with the bottom surface 38 thereof—is to be towed, the top surface 36 of the board 22 is preferably positioned in contact with the axle 26, so that the fin 40 is oriented in a relatively upwardly direction toward the frame 34, as illustrated in FIG. 1. In this way, the top surface 36 of the rear end 32 of the at least one board 22—nearest to the fin 40—is capable of being selectively placed in contact with the axle 26 and slid through the frame 34 until the fin 40 of the board 22 is in abutting contact with the frame 34 (FIG. 7). Thus, the frame 34 assists in substantially maintaining the board 22 in place on the axle 26. It should be noted that the frame 34 may be selectively oriented—by rotating the axle 26 relative to the board 22—anywhere between a substantially vertical orientation (FIG. 7), wherein the frame 34 is in abutting contact with the fin 40, and a substantially horizontal orientation (FIG. 1), wherein the frame 34 is in abutting contact with the fin 40 and/or the bottom surface 38 of the board 22. With the frame 34 in such a substantially horizontal orientation, the wheel assembly 24 is capable of frictionally sandwiching the board 22 between the frame 34 and axle 26. This substantially horizontal orientation is also beneficial where the object(s) to be towed does not have a fin 40 or other such relatively perpendicular protrusion for abutting the frame 34. In the exemplary embodiment, the frame 34 and axle 26 are made of a relatively rigid material, such as metal or plastic, and are each preferably covered with a padded sleeve 42 to prevent damage to the board 22 during use. In further embodiments, the frame 34 is made of a relatively resilient material—such as rubber or a relatively thin metal or plastic—thereby allowing the frame 34 to temporarily deform so as to better accommodate boards 22 or other objects of varying widths and thicknesses. In still further embodiments, each of the frame 34 and axle 26 may be made of any material, or combination of materials, now known or later developed, so long as they are capable of substantially carrying out the functionality herein described. It should also be noted that, while the frame 34 is shown in the drawings as being continuous in structure and of rectangular (FIG. 2) or arcuate (FIG. 3) shape, the exact size and shape of the frame 34 should not be read as being so limited. Again, the size and shape of the frame 34, in any given embodiment, is dependent at least in part upon the particular objects that are to be supported by the axle 36 and towed by the system 20. As such, in further embodiments, not shown, the frame 34 may take on any other shape or size now known or later developed—including having a non-continuous or disjointed structure—so long as the frame 34 is capable of substantially carrying out the functionality herein described.

In at least one embodiment, the wheel assembly 24 provides an at least one retaining strap 44 configured for selectively engaging and maintaining the rear end 32 of the at least one board 22 in position between the axle 26 and the frame 34. As illustrated best in FIG. 7, where the object to be towed has a relatively perpendicular protrusion, such as the fin 40 of the board 22, the retaining strap 44 is capable of contacting a leading edge 46 of the fin 40; thus, urging the fin 40 back into abutting contact with the frame 34 for substantially maintaining the rear end 32 of the board 22 within the frame 34. In one embodiment, illustrated in FIG. 1, the retaining strap 44 is permanently engaged with the wheel assembly 24 and is capable of simply stretching over the board 22. In an alternate embodiment, illustrated in FIGS. 3 and 7, the retaining strap 44 is removably engagable with the wheel assembly 24 for engagement over the board 22. In at least one such alternate embodiment, the wheel assembly 24 provides a pair of laterally opposed strap hooks 48 positioned proximal opposing axle ends 30; each of the strap hooks 48 being configured for removable engagement with one of a plurality of corresponding strap apertures 50 positioned on the retaining strap 44. In this way, the engagement between the retaining strap 44 and wheel assembly 24 may be selectively adjusted to approximate the dimensions of, and thereby more tightly secure, the board 22 or other object to be towed. It should be noted that the particular retaining strap 44 and strap hooks 48 shown in the drawings are merely illustrative of said elements in at least one embodiment. As such, the particular structure, relative positioning, and materials of construction of each of the retaining strap 44 and strap hooks 48 may vary in further embodiments, so long as they are capable of substantially carrying out the functionality herein described.

Figure 3:
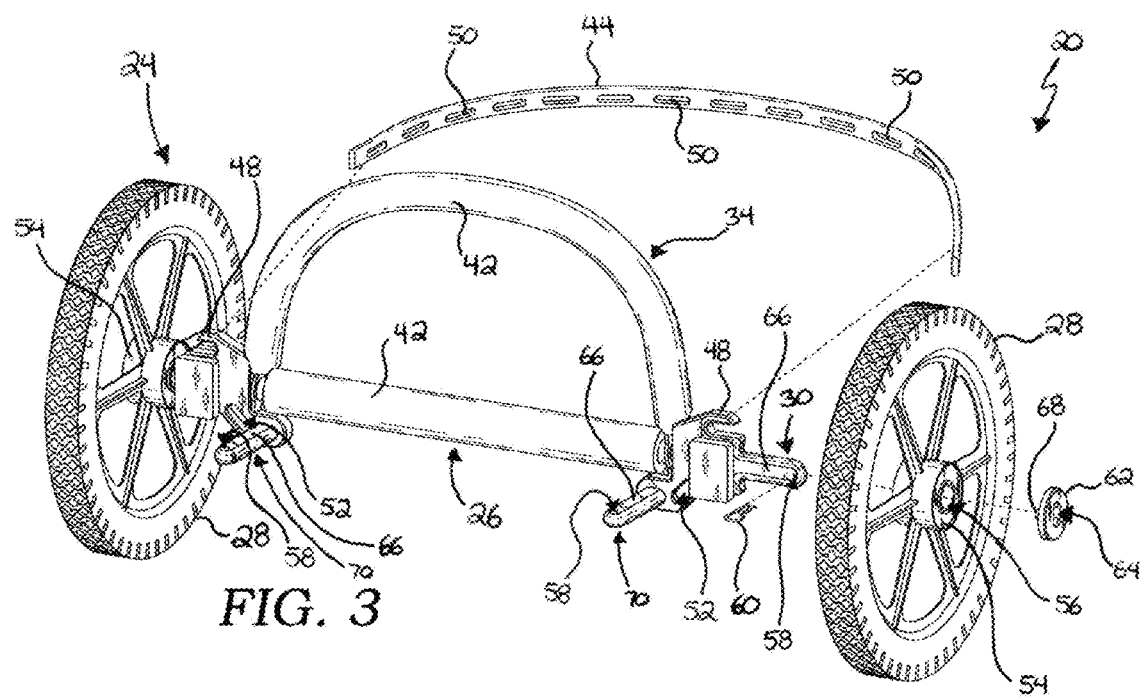
FIG. 3 is a perspective, partially exploded view of a further exemplary wheeled transport system, in accordance with at least one embodiment.

With continued reference to FIG. 3, the wheel assembly 24 further provides, in the exemplary embodiment, a pair of laterally opposed hook apertures 52 preferably positioned proximal the respective strap hooks 48. The purpose of the hook apertures 52 is to provide an alternative means for selectively securing the board 22 to the wheel assembly 24 if necessary—for example, in the event the retaining strap 44 is lost or misplaced. In a bit more detail, the hook apertures 52 are sized and positioned for allowing a standard bungee cord to be used by inserting the hooks of the bungee cord through each of the hook apertures 52. Similarly, a length of rope or other cord could be used by threading the ends of the rope through each of the hook apertures 52 and securing the ends thereto.

In at least one embodiment, each of the wheels 28 is permanently engaged with the respective axle end 30. In further embodiments, each of the wheels 28 is removably engagable with the respective axle end 30, thereby allowing the wheel assembly 24 to be relatively modular during non-use for assisting in the storage and transport thereof. In at least one such further embodiment, as illustrated in FIG. 3, a hub 54 of each wheel 28 defines an axle aperture 56 extending therethrough, sized and configured for approximating an outer diameter of, and selectively receiving, the respective axle end 30, thereby allowing the wheel 28 to freely rotate about the axle end 30. Each axle end 30 further defines a clip aperture 58 extending therethrough, sized and configured for selectively receiving a retaining clip 60. Thus, with the wheels 28 positioned on the axle ends 30, the axle ends 30 extending through the respective axle apertures 56 of the hubs 54, and the retaining clips 60 engaged within the respective clip apertures 58, the retaining clips 60 are capable of substantially preventing the wheels 28 from becoming unintentionally disengaged from the axle ends 30. In further such embodiments, a pair of hub caps 62 is provided; each hub cap 62 defining a cap aperture 64 extending therethrough, sized and configured for approximating the outer diameter of, and selectively receiving, the respective axle end 30. Each hub cap 62 is configured for being selectively positioned on the respective axle end 30 after the respective wheel 28 has already been positioned thereon, such that the hub cap 62 is positioned between the respective wheel 28 and retaining clip 60. In this way, each hub cap 62 is capable of substantially preventing the respective retaining clip 60 from impeding the rotation of the respective wheel 28 during use of the wheel assembly 24. In further such embodiments, shown best in FIG. 3, each axle end 30 provides a keyed surface 66 and each cap aperture 64 is shaped to match that keyed surface 66. In this way, each of the hub caps 62 and retaining clips 60 remain substantially stationary along with the axle 26—i.e., they do not rotate along with the wheels 28—thereby allowing the wheels 28 to rotate about the axle ends 30 substantially unimpeded by the hub caps 62 and retaining clips 60. In such embodiments, to prevent the keyed surface 66 of each axle end 30 from affecting the ability of the respective wheel 28 to rotate thereabout, each hub cap 62 preferably provides an at least one arcuate tab 68 adjacent the cap aperture 64 and protruding perpendicularly therefrom. With the respective wheel 28 positioned on the axle end 30, and with the hub cap 62 also positioned on the axle end 30, the tab 68 is configured for extending through the axle aperture 56 of the hub 54 and contacting the keyed surface 66 of the axle end 30, such that the tab 68 is positioned between the axle aperture 56 and the keyed surface 66. Furthermore, because the at least one tab 68 is preferably arcuate in cross-section, its engagement with the keyed surface 66 of the axle end 30 assists in creating a substantially cylindrical surface about which the respective hub 54—and, thus, the wheel 28—may rotate.

In further embodiments, other means, now known or later developed, may be substituted for creating a removable engagement between the wheels 28 and the respective axle ends 30. In one such embodiment, partially illustrated in FIGS. 1 and 2, each wheel 28 is configured for being press fit onto the respective axle end 30, such as through a flared and/or compressible member (not shown) integral with the axle end 30 and a corresponding recess (not shown) in the hub 54 of the wheel 28; said press fit being tight enough to substantially prevent the wheel 28 from becoming unintentionally disengaged from the axle end 30 during use, while still loose enough to allow the wheel 28 to freely rotate about the axle end 30.

Figure 4:
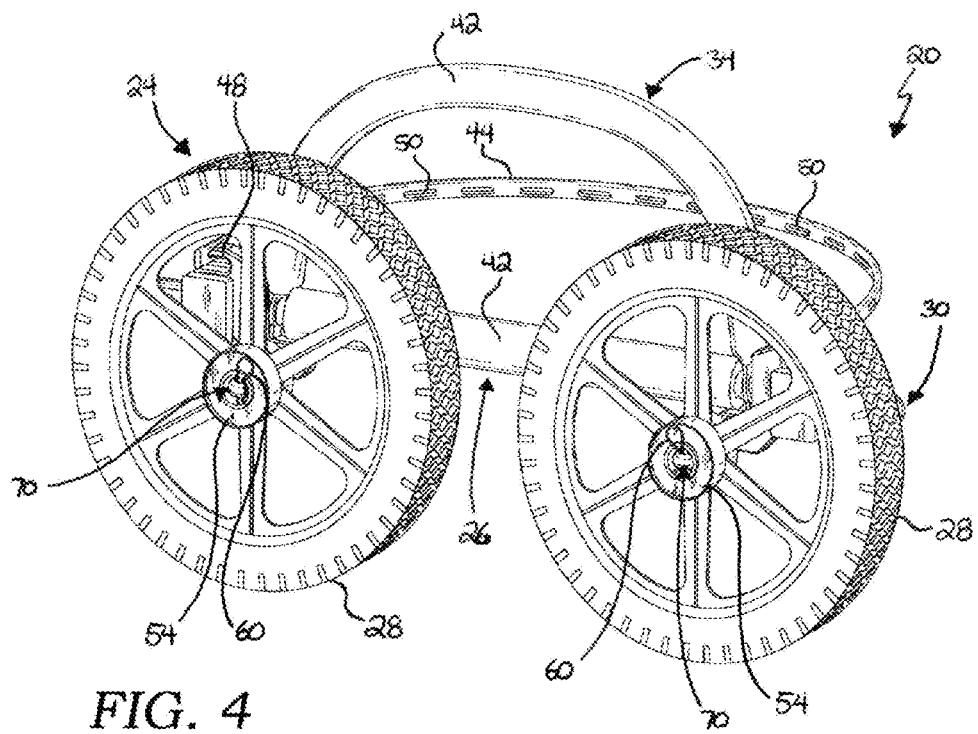
FIG. 4 is a perspective view thereof, showing the wheeled transport system in a stored state, in accordance with at least one embodiment.

Further assisting in the storage and transport of the wheel assembly 24 when not in use, the axle 26 provides, in at least one embodiment, a pair of storage axles 70 extending therefrom in a plane substantially perpendicular to the frame 34, as illustrated best in FIGS. 3 and 4. The dimensions of the storage axles 70 are preferably similar, if not identical, to the dimensions of the axle ends 30; as are the means for removably engaging the wheels 28 therewith. In this way, the wheel assembly 24 is capable of being selectively arranged into one of a deployed state—wherein the wheels 28 are engaged with the axle ends 30 for using the wheel assembly 24 (FIG. 3)—and a stored state—wherein the wheels 28 are engaged with the storage axles 70 for storing and/or transporting the wheel assembly 24 (FIG. 4). Preferably, the storage axles 70 are parallel with one another and sufficiently spaced apart such that the wheels 28 are linearly aligned with one another when engaged with the storage axles 70. This arrangement not only allows the wheel assembly 24 to have a relatively flat profile for easier storage when in the stored state, but also allows the linearly aligned wheels 28 to freely rotate about the storage axles 28 for assisting in the transport of the wheel assembly 24 when in the stored state. Additionally, the frame 34 may be used as a carrying handle.

Figure 5:
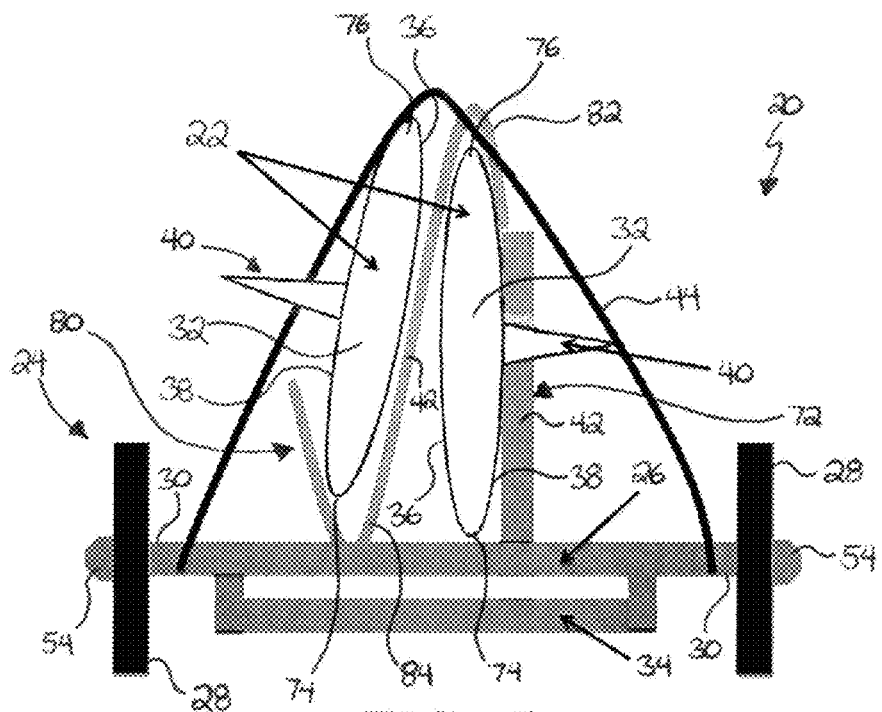
FIG. 5 is a rear elevational view of a further exemplary wheeled transport system, in accordance with at least one embodiment.
Figure 6:
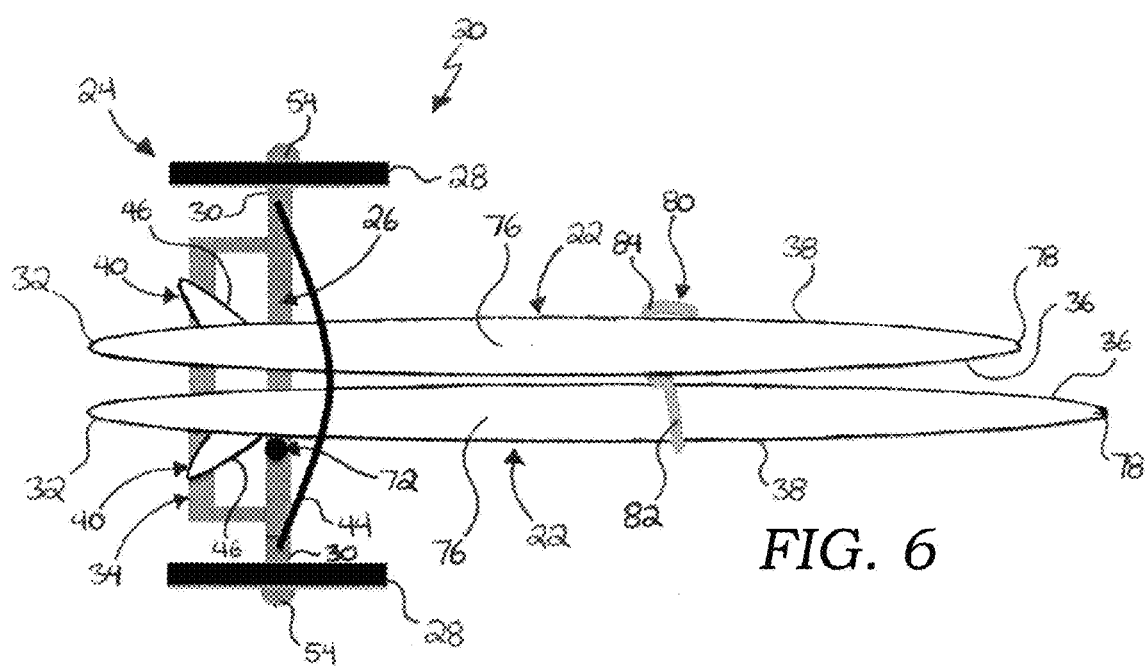
FIG. 6 is a perspective view thereof.

Referring now to FIGS. 5 and 6, in at least one embodiment, the axle 26 further provides a support post 72 extending substantially perpendicularly therefrom and configured for providing the option of towing one or more boards 22 in a laterally stacked fashion, with a substantially downwardly-oriented lateral edge 74 of each board 22 in contact with the axle 26. Preferably, the support post 72 is positioned in a plane substantially perpendicular to the frame 34, allowing either the frame 34 or the support post 72 to be selectively utilized—depending on the dimensions and number of boards 22 to be towed—without either structure interfering with the functionality of the other. In one such embodiment, the support post 72 is integral with the axle 26. In another such embodiment, the support post 72 is removably engagable with the axle 26. In use, where boards 22—or other objects each having an at least one fin 40 or other relatively perpendicular protrusion integral with the bottom surface 38 thereof—are to be towed in such a laterally stacked fashion on the axle 26, the board 22 nearest to the support post 72—preferably the longest of the boards 22—is preferably positioned such that both the bottom surface 38 of the board 22, as well as the leading edge 46 of the fin 40, are in contact with the support post 72. The retaining strap 44 is then engaged over an opposing, substantially upwardly-oriented lateral edge 76 of the boards 22 for securing them to the wheel assembly 24. In this way, during use, as the boards 22 are grasped proximal an opposing front end 78 of the boards 22 and pulled or pushed therefrom—thus, also pulling/pushing the wheel assembly 24—the support post 72 (along with the retaining strap 44) prevents the boards 22 from tipping over or moving out of position on the wheel assembly 24.

With continued reference to FIGS. 5 and 6, in at least one embodiment, the system 20 further provides a support hook 80 configured for selectively engaging the boards 22 and assisting in preventing the boards 22 from separating from one another; thus, allowing them to move as a single unit, making it relatively easier to manually tow and transport multiple boards 22 using the system 20. In a bit more detail, the support hook 80 comprises, in the exemplary embodiment, an upper hook 82 positioned and configured for engaging the substantially upwardly-oriented lateral edge 76 of one of the boards 22—preferably the longest of the boards 22—and an opposing lower hook 84 positioned and configured for engaging the substantially downwardly-oriented lateral edge 74 of the other at least one board 22. Similar to the axle 26 and frame 34, each of the support post 72 and support hook 80 are preferably covered with a padded sleeve 42 to prevent damage to the boards 22 during use. It should be noted that, in further embodiments, the particular shape and dimensions of the support hook 80 may vary, depending in part on the number and type of objects to be towed by the system 20, without departing from the spirit and scope of the present invention.

It should also be noted that the system 20, in at least one embodiment, is also capable of towing a plurality of boards 22—or other objects—in a vertically stacked fashion with the boards 22 each in a horizontally flat orientation. In such an embodiment, the boards 22 are preferably stacked with the top surface 36 of the longest of the boards 22 in contact with the axle 26, the top surface 36 of the next shortest of the boards 22 in contact with the bottom surface 38 of the preceding board 22, etc. Additionally, the rear end 32 of at least the longest of the boards 22 is positioned within the frame 34 with the fin 40 in abutting contact therewith. With the boards 22 so positioned, the retaining strap 44 may be placed in contact with the leading edge 46 of the fin 40 of the topmost board 22, thereby assisting to retain the entire stack of boards 22 in position on the wheel assembly 24 during use.

Thus, with the at least one board 22—or other object—securely positioned on the wheel assembly 24 in an appropriate orientation, such that the axle 26 of the wheel assembly 24 is supporting most of the weight of the board 22, a user (not shown) is capable of grasping and manually lifting the front end 78 of the board 22 by hand, allowing the user to either push or pull the at least one board 22—along with the wheel assembly 24—with relative ease.

Referring now to FIG. 7, there is shown a tow strap assembly 86 that may optionally be used in combination with the wheel assembly 24, in at least one embodiment, for further assisting in the transport of the object(s) to be towed, by allowing said object(s), while secured to the wheel assembly 24, to be selectively grasped by hand or engaged with a bicycle seat (not shown) or similarly dimensioned seat of a different type of vehicle. In a bit more detail, the tow strap assembly 86 comprises a longitudinally-oriented main strap 88 sized and configured for extending at least the entire length of the at least one board 22 (or other object). The main strap 88 is positionable underneath the board 22—preferably on or near a longitudinal centerline 90 of the board—for supporting the portion of the board 22 that is not supported by the axle 26.

A proximal end 92 of the main strap 88 provides a means for removable engagement with the axle 26 of the wheel assembly 24, while a distal end 94 of the main strap 88 provides a handle portion 96. In the exemplary embodiment, as shown in FIG. 7, the means for removable engagement is simply a loop 98 of strap material formed at the proximal end 92 of the main strap 88, allowing the main strap 88 to be wrapped around the axle 26 and then threaded through the loop 98 for securing the main strap 88 to the axle 26. In further embodiments, any other means, now known or later developed, capable of creating a removable engagement between the main strap 88 and the axle 26 may be substituted.

The handle portion 96 is configured for allowing the tow strap assembly 86—and, thus, the wheel assembly 24 and board(s) 22—to be selectively pulled or towed during transport. In the exemplary embodiment, as shown in FIG. 7, the handle portion 96 is integral with the distal end 94 of the main strap 88 and defines a handle aperture 100 therewithin, enabling the user to grasp a leading end 102 of the handle portion 96 by hand with relative ease. The leading end 102 further preferably provides a padded sleeve 42 for added comfort. Additionally, in at least one embodiment, the handle portion 96 provides a seat engagement piece 104 spanning at least a portion of the handle aperture 100 and configured for allowing the handle portion 96 to be removably engaged with the bicycle seat (or similarly dimensioned seat of a different type of vehicle). In a bit more detail, the seat engagement piece 104 is configured for contacting a top surface of the bicycle seat while a front end of the seat extends though the unobstructed portion of the handle aperture 100, thereby securely positioning the leading end 102 of the handle portion 96 underneath the seat. In this way, with the user seated on the bicycle—thus, sandwiching the handle portion 96 between the user and the seat—a secure engagement is created between the handle portion 96 and the bicycle seat, thereby allowing the user to tow the wheel assembly 24 with the bicycle. The seat engagement piece 104 is preferably constructed of a webbing material, a further length of strap material, or some other type of fabric; though, in further embodiments, the seat engagement piece 104 may be constructed of any other type of material now known or later developed, capable of allowing it to substantially carry out the functionality herein described. Additionally, in further embodiments, the particular size and dimensions of each of the handle portion 96, handle aperture 100, and seat engagement piece 104 may vary to accommodate seats—or comparable structures—of varying dimensions. In still further embodiments, not shown, the handle portion 96 is configured for being removably secured to a seat post of the bicycle seat.

With continued reference to FIG. 7, the tow strap assembly 86 further comprises an at least one laterally-oriented stabilizer strap 106 engaged with the main strap 88, proximal the distal end 94 thereof, and configured for selectively securing the at least one board 22 (or other object) to the main strap 88. Additionally, the stabilizer strap 106 assists in maintaining the position of the main strap 88 on or near the longitudinal centerline 90 of the board 22 for maintaining a proper load balance on the wheel assembly 24 during use. In at least one embodiment, the stabilizer strap 106 is permanently secured in place on the main strap 88. However, in further embodiments, as illustrated in FIG. 7, the stabilizer strap 106 is slidably secured on the main strap 88, allowing the stabilizer strap 106 to selectively traverse the length of the main strap 88 for accommodating boards 22 (or other objects) of varying lengths. Preferably, the stabilizer strap 106 is positioned for engagement about the board 22 proximal the front end 78 of the board 22 so as to maximize stability. Engagement with the board 22 is achieved, in at least one embodiment, via a buckle 108 integral with the stabilizer strap 106, allowing the stabilizer strap 106 to be wrapped around the board 22 and secured to itself using the buckle 108—though, other securing means now known or later developed may be substituted. Additionally, the stabilizer strap 106 is preferably selectively lengthwise adjustable for accommodating boards 22 (or other objects) of varying widths. Similarly, in at least one embodiment, the main strap 88 is selectively lengthwise adjustable for accommodating boards 22 (or other objects) of varying lengths.

It should be noted that the particular tow strap assembly 86 shown in the drawings is merely illustrative of said element in accordance with at least one embodiment. As such, the particular structure, relative positioning, and materials of construction of the tow strap assembly 86 may vary in further embodiments, so long as it is capable of substantially carrying out the functionality herein described.

Figure 8:
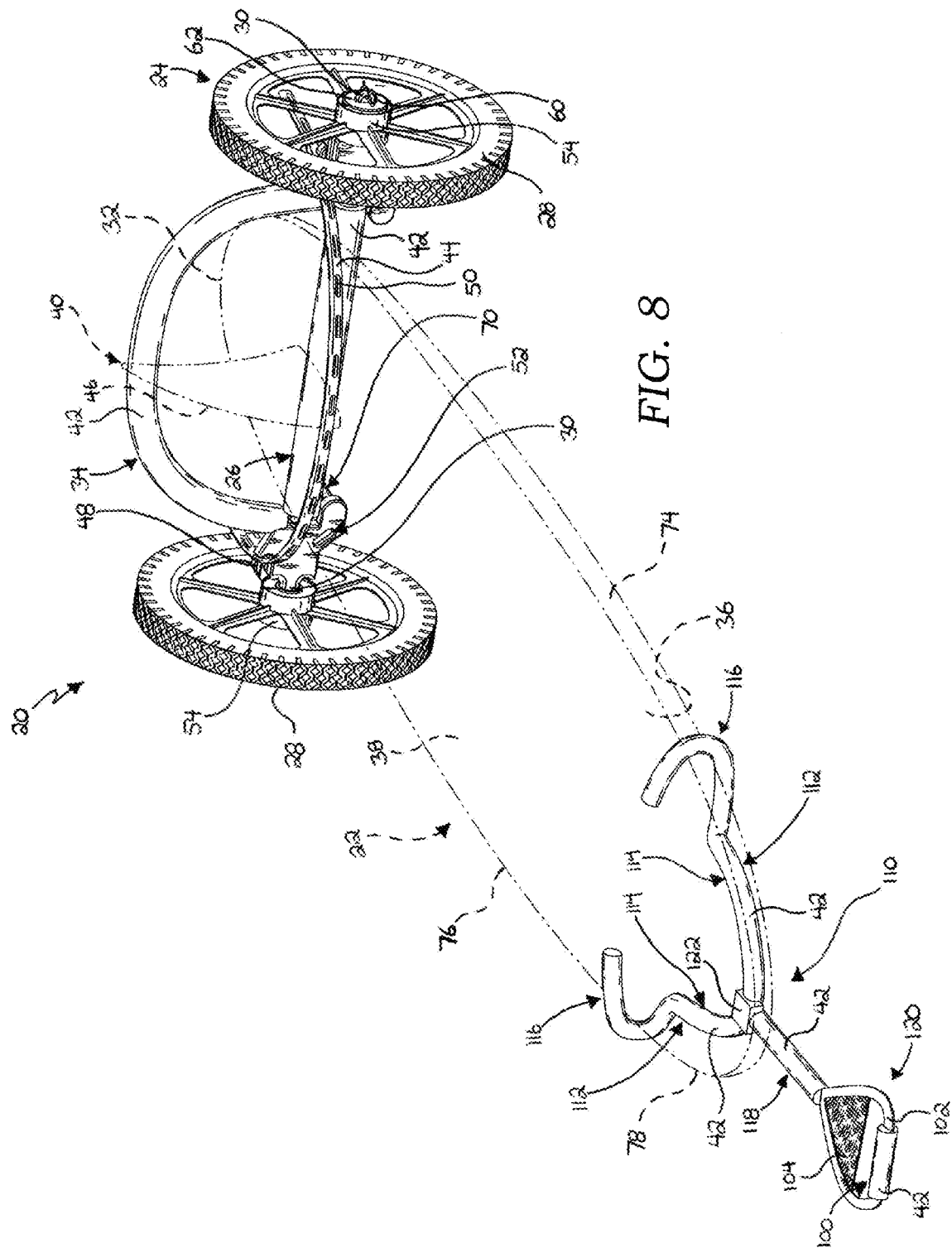
FIG. 8 is a perspective view of a still further exemplary wheeled transport system, in accordance with at least one embodiment.

Referring now to FIG. 8, there is shown a further means for assisting in the transport of the object(s) to be towed; namely, a tow fork 110 that may optionally be used in combination with the wheel assembly 24, in at least one embodiment. In a bit more detail, the tow fork 110 comprises a pair of laterally opposed arms 112 sufficiently spaced apart from one another for accepting the front end 78 of the board 22 therebetween and configured for frictionally engaging the at least one board 22. Each of the arms 112 provides a support portion 114 positioned and configured for selectively contacting the downwardly facing top surface 36 of the board 22—assuming the board 22 is positioned on the wheel assembly 24 with the top surface 36 facing downward. Each of the arms 112 further provides a hook portion 116 integral with the support portion 114 and configured for extending around an adjacent lateral edge 74 or 76 of the board 22 and selectively contacting the upwardly facing bottom surface 38 of the board 22. To assist in selectively pivoting and bringing the arms 112 into frictional contact with the top surface 36 and bottom surface 38 of the board 22, the tow fork 110 preferably provides a lifting portion 118 integral with the arms 112. In the exemplary embodiment, shown in FIG. 8, the lifting portion 118 is integral with the support portion 114 of each arm 112; however, in further embodiments, the lifting portion 118 may be integral with the hook portion 116 of each arm 112. As such, with the tow fork 110 positioned on the front end 78 of the board 22, the lifting portion 118 may be selectively elevated, causing the support portion 114 of each arm 22 to move into frictional contact with the top surface 36 of the board 22 and the hook portion 116 of each arm 112 to move into frictional contact with the bottom surface 38 of the board 22, thereby frictionally sandwiching the board 22 therebetween and allowing the at least one board 22 to be pushed or pulled on the wheel assembly 24 via the tow fork 110.

In the exemplary embodiment, the arms 112 and lifting portion 118 are tubular in shape, made of a relatively rigid material, such as metal or plastic, and are each preferably covered with a padded sleeve 42 to prevent damage to the board 22 during use. In further embodiments, the arms 112 are made of a relatively resilient material, or are simply spring biased, thereby allowing the arms 112 to selectively flex outwardly so as to better accommodate boards 22 or other objects of varying widths and thicknesses. In still further embodiments, each of the arms 112 and lifting portion 118 may be made of any material, or combination of materials, now known or later developed, so long as they are capable of substantially carrying out the functionality herein described. It should also be noted that the exact size and shape of the arms 112 should not be read as being so limited to the exemplary embodiment illustrated in FIG. 8. Again, the size and shape of the arms 112, in any given embodiment, is dependent at least in part upon the particular objects that are to be supported by the axle 36 and towed by the system 20. As such, in further embodiments, not shown, the tow fork 110 may take on any other shape or size now known or later developed, so long as the tow fork 110 is capable of substantially carrying out the functionality herein described.

It should also be noted that, in embodiments where the system 20 is configured for towing a plurality of boards 22—or other objects—in a vertically stacked fashion with the boards 22 each in a horizontally flat orientation, the arms 112 of the tow fork 110 are sized and configured such that the support portion 114 of each arm 112 selectively contacts the downwardly facing top surface 36 of the lowermost board 22 in the stack and the hook portion 116 of each arm 112 selectively contacts the upwardly facing bottom surface 38 of the topmost board 22 in the stack; thereby frictionally sandwiching the stack of boards 22 therebetween.

In the exemplary embodiment, a free end of the lifting portion 118 is integral with a handle portion 120 configured for assisting in the selective elevating, pushing or pulling of the lifting portion 118. As illustrated in FIG. 8, in one such embodiment, the handle portion 120 is identical to that utilized by the exemplary tow strap assembly 86 shown in FIG. 7, which allows the handle portion 120—and, thus, the tow fork 110—to be configured for selectively being grasped by hand or engaged with a bicycle seat. In further embodiments, the handle portion 120 is simply a loop of strap material. In still further embodiments, the handle portion 120 is configured for being removably secured to a seat post of the bicycle seat. In still further embodiments, the handle portion 120 may comprise any structure and/or material(s) of construction, now known or later developed, capable of allowing it to substantially carry out the functionality herein described.

With continued reference to FIG. 8, in at least one embodiment, the tow fork 110 further provides an at least one high-friction block 122 integral with the arms 112 and positioned and configured for providing a high-friction surface upon which the downwardly facing top surface 36 of the board 22 may rest when the arms 112 are moved into contact with the board 22. The high-friction block 122 thus assists in maintaining frictional contact between the tow fork 110 and the at least one board 22 while towing the board 22. In the exemplary embodiment, the block 122 is made of a high-friction rubber. However, in alternate embodiments, the block 122 may be made of any other high-friction material, or combination of materials, now known or later developed, capable of allowing the block 122 to substantially carry out the functionality herein described. In still further such embodiments, the arms 112 may similarly be made of, or at least coated in, a high-friction material.

In further embodiments, not shown, the tow fork 110 may provide a longitudinally oriented strap—similar to the main strap 88 of the tow strap assembly 86 shown in FIG. 7—sized and configured for extending at least the entire length of the at least one board 22 (or other object) and positionable underneath the longitudinal centerline 90 of the board 22 for assisting in supporting the portion of the board 22 that is not supported by the axle 26 of the wheel assembly 24. In such embodiments, a proximal end of the strap is removably engagable with the axle 26, while a distal end of the strap is engaged, or integral, with the tow fork 110.

To summarize, regarding the exemplary embodiments of the present invention as shown and described herein, it will be appreciated that a wheeled transport system is disclosed and configured for allowing one or more long, cumbersome objects to be towed and transported with relative ease. Because the principles of the invention may be practiced in a number of configurations beyond those shown and described, it is to be understood that the invention is not in any way limited by the exemplary embodiments, but is generally directed to a wheeled transport system and is able to take numerous forms to do so without departing from the spirit and scope of the invention. Furthermore, the various features of each of the above-described embodiments may be combined in any logical manner and are intended to be included within the scope of the present invention.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A wheeled transport system for towing an at least one object, said object having a front end, an opposing rear end and two opposing lateral edges, the system comprising:
    a wheel assembly comprising:
        an axle sized and configured for supporting the rear end of the at least one object thereon;
        a pair of wheels rotatably engagable with opposing ends of the axle;
        a frame integral with the axle in a position between the wheels, the frame sized and configured for slidably receiving therethrough the rear end of the at least one object;
        an at least one retaining strap configured for selectively engaging and maintaining the rear end of the at least one object in position between the axle and the frame; and
        a pair of storage axles integral with the axle and extending therefrom in a plane substantially perpendicular to the frame, each of the storage axles configured for selectively receiving one of the wheels in rotatable engagement therewith;

whereby, the wheel assembly is capable of being selectively arranged into one of a deployed state, wherein the wheels are engaged with the axle ends for selectively receiving and towing the at least one object during use, and a stored state, wherein the wheels are engaged with the storage axles for storing or transporting the wheel assembly during non-use.

2. The wheeled transport system of claim 1, wherein the frame is made of resilient material for allowing the frame to temporarily deform so as to better accommodate objects of varying widths and thicknesses.

3. The wheeled transport system of claim 1, wherein the retaining strap is removably engagable with the wheel assembly.

4. The wheeled transport system of claim 3, wherein the wheel assembly further comprises a pair of laterally opposed strap hooks positioned proximal opposing axle ends, each of the strap hooks being configured for removable engagement with one of a plurality of corresponding strap apertures positioned on the retaining strap.

5. The wheeled transport system of claim 4, wherein the wheel assembly further comprises a pair of laterally opposed hook apertures positioned proximal opposing axle ends and configured for providing an alternative means for selectively engaging and maintaining the rear end of the at least one object in position between the axle and the frame.

6. The wheeled transport system of claim 1, wherein a hub of each wheel defines an axle aperture extending therethrough sized and configured for approximating an outer diameter of, and selectively receiving, the respective axle end, thereby allowing the wheel to freely rotate about the axle end.

7. The wheeled transport system of claim 6, wherein each axle end defines a clip aperture extending therethrough, sized and configured for selectively receiving a retaining clip such that, with the wheels positioned on the axle, the respective axle ends extending through the respective axle apertures of the hubs, and the retaining clips engaged within the respective clip apertures, the retaining clips are capable of substantially preventing the wheels from becoming unintentionally disengaged from the axle.

8. The wheeled transport system of claim 7, further comprising a pair of hub caps, each hub cap defining a cap aperture extending therethrough sized and configured for approximating the outer diameter of, and selectively receiving, the respective axle end, the hub caps configured for being selectively engaged on the respective axle ends in a position between the respective wheels and retaining clips, thereby substantially preventing the retaining clips from impeding the rotation of the wheels during use of the wheel assembly.

9. The wheeled transport system of claim 8, wherein each axle end provides a keyed surface and each cap aperture is shaped to match said keyed surface, thereby allowing each of the hub caps and retaining clips to remain substantially stationary along with the axle such that the wheels are capable of rotating about the respective axle ends substantially unimpeded by the hub caps and retaining clips.

10. The wheeled transport system of claim 9, wherein each hub cap provides an at least one tab positioned adjacent the cap aperture and protruding perpendicularly therefrom, the at least one tab being arcuate in cross-section and configured for extending through the axle aperture of the hub and contacting the keyed surface of the axle for assisting in creating a substantially cylindrical surface about which the respective the wheel may rotate.

11. The wheeled transport system of claim 1, wherein each axle end provides a compressible member and each hub provides a corresponding recess configured for removably receiving said compressible member in a press fit engagement, said press fit engagement being tight enough to substantially prevent the wheel from becoming unintentionally disengaged from the axle end during use, while still loose enough to allow the wheel to freely rotate about the axle end.

12. The wheeled transport system of claim 1, wherein the storage axles are positioned parallel with one another and sufficiently spaced apart such that the wheels are linearly aligned with one another when engaged with the storage axles.

13. The wheeled transport system of claim 1, further comprising a support post integral with the axle and extending substantially perpendicularly therefrom, the support post configured for providing the option of towing one or more objects in a laterally stacked fashion, with a substantially downwardly-oriented lateral edge of each object in contact with the axle.

14. The wheeled transport system of claim 13, wherein the support post is positioned in a plane substantially perpendicular to the frame, allowing either the frame or the support post to be selectively utilized, depending on the number of objects to be towed, without either structure interfering with the functionality of the other.

15. The wheeled transport system of claim 13, further comprising a support hook configured for selectively engaging the objects and assisting in preventing the objects from separating from one another when positioned on the axle, the support hook comprising:

an upper hook positioned and configured for engaging a substantially upwardly-oriented lateral edge of a first one of the objects; and an opposing lower hook positioned and configured for engaging the substantially downwardly-oriented lateral edge of a second one of the objects.

16. The wheeled transport system of claim 1, further comprising a tow strap assembly configured for further assisting in the transport of the at least one object, the tow strap assembly comprising:

a longitudinally-oriented main strap sized and configured for extending at least the entire length of the at least one object and positionable substantially underneath a longitudinal centerline of the object for supporting the portion of the object that is not supported by the axle;

a proximal end of the main strap providing a means for removable engagement with the axle;

a distal end of the main strap providing a handle portion, the handle portion defining a handle aperture therewithin configured for selectively being grasped by hand or engaged with a bicycle seat;

a seat engagement piece spanning at least a portion of the handle aperture and configured for selectively contacting a top surface of the bicycle seat while a front end of the seat extends though an unobstructed portion of the handle aperture, thereby securely positioning a leading end of the handle portion underneath the seat; and an at least one laterally-oriented stabilizer strap engaged with the main strap proximal the distal end thereof and configured for selectively securing the at least one object to the main strap.

17. A wheeled transport system for towing an at least one object, said object having a front end, an opposing rear end and two opposing lateral edges, the system comprising:

a wheel assembly comprising:

an axle sized and configured for supporting the rear end of the at least one object thereon;

a pair of wheels rotatably engagable with opposing ends of the axle;

a frame integral with the axle in a position between the wheels, the frame sized and configured for slidably receiving therethrough the rear end of the at least one object;

an at least one retaining strap configured for selectively engaging and maintaining the rear end of the at least one object in position between the axle and the frame; and an at least one storage axle integral with the axle and extending therefrom in a plane substantially perpendicular to the frame, the at least one storage axle configured for selectively receiving at least one of the wheels in rotatable engagement therewith;

whereby, the wheel assembly is capable of being selectively arranged into one of a deployed state, wherein the wheels are engaged with the axle ends for selectively receiving and towing the at least one object during use, and a stored state, wherein the wheels are engaged with the at least one storage axle for storing or transporting the wheel assembly during non-use.

18. A wheeled transport system for towing an at least one object, said object having a front end, an opposing rear end and two opposing lateral edges, the system comprising:

a wheel assembly comprising:

an axle sized and configured for supporting the rear end of the at least one object thereon;

a pair of wheels rotatably engaged with opposing ends of the axle;

a frame integral with the axle in a position between the wheels, the frame sized and configured for slidably receiving therethrough the rear end of the at least one object in a position between the axle and frame;

an at least one retaining strap configured for selectively engaging and maintaining the rear end of the at least one object in position between the axle and the frame; and a support post integral with the axle and extending therefrom in a plane substantially perpendicular to a plane in which the frame is positioned, the support post configured for providing the option of towing one or more objects in a laterally stacked fashion, with a substantially downwardly-oriented lateral edge of each object in contact with the axle;

whereby, the wheel assembly is capable of selectively supporting the at least one object in either a vertically stacked fashion or a laterally stacked fashion, depending on the dimensions of the at least one object, thus enabling the system to support and tow a wide range of objects with relative ease.

19. A wheeled transport system for towing an at least one object, said object having a front end, an opposing rear end and two opposing lateral edges, the system comprising:

a wheel assembly comprising:

an axle sized and configured for supporting the rear end of the at least one object thereon;

a pair of wheels rotatably engaged with opposing ends of the axle;

a frame integral with the axle in a position between the wheels, the frame sized and configured for slidably receiving therethrough the rear end of the at least one object; and an at least one retaining strap configured for selectively engaging and maintaining the rear end of the at least one object in position between the axle and the frame; and a tow strap assembly comprising:

a longitudinally-oriented main strap sized and configured for extending at least the entire length of the at least one object and positionable substantially underneath a longitudinal centerline of the object for supporting the portion of the object that is not supported by the axle;

a proximal end of the main strap providing a means for removable engagement with the axle;

a distal end of the main strap providing a handle portion, the handle portion defining a handle aperture therewithin configured for selectively being grasped by hand or engaged with a bicycle seat;

a seat engagement piece spanning at least a portion of the handle aperture and configured for selectively contacting a top surface of the bicycle seat while a front end of the seat extends though an unobstructed portion of the handle aperture, thereby securely positioning a leading end of the handle portion underneath the seat; and an at least one laterally-oriented stabilizer strap engaged with the main strap proximal the distal end thereof and configured for selectively securing the at least one object to the main strap.

20. The wheeled transport system of claim 1, further comprising a tow fork for use in combination with the wheel assembly, the tow fork comprising:

a pair of laterally opposed arms sufficiently spaced apart from one another for receiving the front end of the at least one object therebetween;

each of the arms providing a support portion positioned and configured for selectively contacting and supporting a relatively downwardly oriented surface of the object;

each of the arms further providing a hook portion integral with the support portion and configured for extending up and around an adjacent one of the lateral edges of the object and selectively contacting a relatively upwardly oriented surface of the object; and a lifting portion integral with the arms and configured for assisting in selectively pivoting and bringing the arms into frictional contact with the each of the upwardly and downwardly oriented surfaces of the at least one object;

whereby, with the rear end of the at least one object secured to the wheel assembly and the tow fork positioned on the front end of the at least one object, the lifting portion is capable of being selectively elevated, causing the support portion of each arm to move into frictional contact with the downwardly oriented surface of the object and the hook portion of each arm to move into frictional contact with the upwardly oriented surface of the object, thereby frictionally sandwiching the at least one object therebetween and allowing it to be pushed or pulled on the wheel assembly via the tow fork.

\* \* \* \* \*